United States Patent [19]

Grimm

[11] Patent Number: 4,979,523
[45] Date of Patent: Dec. 25, 1990

[54] FINGERNAIL IRRADIATION APPARATUS PARTICULARLY FOR CURING PHOTOCURABLE PLASTIC ARTIFICIAL FINGERNAILS

[75] Inventor: Ekkehard Grimm, Offenbach am Main, Fed. Rep. of Germany

[73] Assignee: Heraeus Kulzer GmbH, Hanau am Main, Fed. Rep. of Germany

[21] Appl. No.: 228,293

[22] Filed: Aug. 4, 1988

[30] Foreign Application Priority Data

Aug. 21, 1987 [DE] Fed. Rep. of Germany ....... 3727916

[51] Int. Cl.$^5$ ............................................. A61N 5/00
[52] U.S. Cl. ............................... 132/73.5; 250/504 R; 250/492.1
[58] Field of Search ............................... 132/73, 73.5; 250/504 R, 492.1, 493.1

[56] References Cited

U.S. PATENT DOCUMENTS

| | | | |
|---|---|---|---|
| 2,506,308 | 5/1950 | Maynier | 132/73 |
| 3,928,113 | 12/1975 | Rosenberg | 156/344 |
| 4,058,442 | 11/1977 | Lee, Jr. et al. | 522/33 |
| 4,076,665 | 2/1978 | Lawson | 525/32.1 |
| 4,206,556 | 6/1980 | Sabo et al. | 132/73.5 |
| 4,596,260 | 6/1986 | Giuliano | 132/73 |
| 4,612,444 | 9/1986 | Ragusa | 250/492.1 |
| 4,682,612 | 7/1987 | Giuliano | 132/73 |
| 4,704,303 | 11/1987 | Cornell | 424/61 |
| 4,708,866 | 11/1987 | Turco et al. | 424/61 |
| 4,731,541 | 3/1988 | Shoemaker | 250/504 R |

FOREIGN PATENT DOCUMENTS

| | | |
|---|---|---|
| 1809666 | 4/1968 | Fed. Rep. of Germany . |
| 1809667 | 4/1968 | Fed. Rep. of Germany . |
| 2161330 | 6/1973 | Fed. Rep. of Germany ..... 132/73.5 |
| 8513789 | 2/1986 | Fed. Rep. of Germany . |
| 8609293 | 9/1986 | Fed. Rep. of Germany . |
| 2465435 | 3/1981 | France . |

OTHER PUBLICATIONS

"Lee Pharmaceuticals", Technical Bulletin No. 7070, Copyright 1975, Lee UV Nails TM.
"Tami Nail® Light System" (publication before Aug. 21, 1987, exact date unknown).

Primary Examiner—Gene Mancene
Assistant Examiner—Adriene B. Lepiane
Attorney, Agent, or Firm—Frishauf, Holtz, Goodman & Woodward

[57] ABSTRACT

To provide for essentially uniform ultraviolet (UV) irradiation of all the nails of all the fingers of a hand of a user, a radiation source of essentially horseshoe shape is placed within a housing. The plane, in which the radiation source is located, is inclined with respect to the bottom wall (2) of the housing, on which the hand of the user is supported. The radiation is directed to impinge on the nails at about 90°. The nail of the thumb also has radiation impinging at about 90°. The radiation source may be a single, bowed, UV-emitting lamp, or may be built-up of straight lamp sections (12,13), e.g., two lamps along the housing sides for irradiating the thumbs, and one or two lamps across the housing to irradiate the nails of the index finger through little finger.

23 Claims, 7 Drawing Sheets

FINGERNAIL IRRADIATION APPARATUS PARTICULARLY FOR CURING PHOTOCURABLE PLASTIC ARTIFICIAL FINGERNAILS

The present invention relates to apparatus for curing photopolymerizable or photocurable fingernails or fingernail prostheses, and more particularly to apparatus of this kind which is simple, effective, easily serviced, and provides a radiation source which is specific to the purpose intended, namely to irradiate only polymerizable or curable fingernails, and few additional surface areas.

BACKGROUND

Short or broken off fingernails can be extended by fingernail tips which are secured to the natural nails by plastic materials which can cure or harden upon radiation with ultraviolet (UV) light. Reference is made to the descriptive literature issued by Lee Pharmaceuticals "LEE UV NAILS" for attachment of fingernail tips. U.S. Pat. No. 4,058,442, Lee et al, and issued to Lee Pharmaceuticals, as well as German Patent Disclosure Document DE-OS No. 25 53 138 describe tips and the plastic material in order to treat the transition regions between the natural and the artificial nail tips.

Normally, to fit an artificial tip on a natural nail, the natural nail is shaped to be round, for example by an emery board, and the tip, which at its underside has a small projection fitting against the round natural fingernail is then placed thereon and adhered by plastic adhesives. The tip which, at the upper side, merges or tapers against the upper side of the natural fingernail then must be treated in order to provide for a smooth appearance and prevent rough spots, ridges or steps. To provide a smooth surface, plastic material is repeatedly applied and, between each application of plastic material, the prior surface is cured or hardened by exposing the nails to a source of UV radiation. Hand polishing and smoothing, for example by an emery board, is also carried out.

It is customary to extend all the nails of one hand in respective steps and then curing all the nails during one curing step. The curing apparatus thus must be so arranged that it spans all five fingers, to cure all five nails in one radiation exposure. The radiation apparatus should be so arranged that it provides uniform radiation to all the nails on the fingers, both with respect to the left as well as with respect to the right hand. The results obtained by known apparatus are, unfortunately, not always uniform with regard to applied radiation, and consequent curing of the plastic material. It is desirable to use as few radiation sources as possible and to irradiate only those regions which require radiation, that is, to provide UV radiation only in the regions of the nails of the fingers. The apparatus should be suitable to treat nails of fingers of widely different sizes.

Various types of radiation apparatus have been propose German Utility Model No. 85 13 789 describes an apparatus in which a base plate is provided above which a plurality of radiation lamps are arranged, the entire structure being retained within a tunnel-shaped housing. Low pressure discharge lamps, such as UV emitting fluorescent lamps, extend into the tunnel, axially, and parallel with respect to each other in the longitudinal direction of the housing, that is, for example essentially parallel to the middle finger of the hand of a user. The lamps irradiate with wave lengths of between about 320 nm to 325 nm. Other lamps may be used which preferably have somewhat longer wave length of, for example, 360 nm to 450 nm in order to harden or cure artificial nail plastic materials.

The technical bulletin 7070 of Lee Pharmaceuticals, above referred to, entitle "LEE UV NAILS", also describes a radiation apparatus to harden artificial nails which, basically, is similar to the apparatus above described with reference to the German Utility Model No. 85 13 789. A plurality of radiation sources are located in a housing, spaced from each other and from a base plate on which the hand of the user can be placed. The hand of the user is introduced into the housing through a slit in a forward wall thereof.

German Utility Model No. 86 09 293 utilizes four elongated radiation lamps which are located above a base plate and form an irradiation tongue. The general structure is similar to that described in the above referred-to German Utility Model No. 85 13 789, and includes the additional feature that the interior space is readily accessible by flipping upwardly the upper portion of the housing about a rear transverse shaft. The irradiation sources are secured to the base plate so that, even if the cover is lifted up, they do not tilt with the cover and remain in position spaced from the base plate. The publication "TAMI NAIL LIGHT SYSTEM" of the company TAMARA COSMETIC of Munich, Fed. Rep. Germany, illustrates a curing apparatus which, in its general construction, conforms essentially to that described in the German Utility Model No. 86 09 293.

THE INVENTION

It is an object to provide an irradiation apparatus for photocurable plastic artificial fingernails in which all fingernails of a hand, regardless of whether the right or left hand, receive essentially uniform radiation and which, preferably, is so arranged that those portions of the fingers and of the hand which do not require radiation, are not exposed to unnecessary irradiation.

Briefly, a radiation source is provided which is located in arcuate or polygonal shape symmetrically with respect to a longitudinal axis of the apparatus, which axis extends, for example, approximately essentially parallel to the middle finger of either hand. The radiation source, for example a single bent irradiation tube or a plurality of straight radiation tubes located at angles with respect to each other to define, at their corners, an arcuate path, are positioned at an inclination with respect to the plane of a flat support surface such that the region of the radiation source which intersects the central longitudinal axis is spaced from the bottom wall by a spacing distance which is longer than the spacing distance thereof at the end portion. Consequently, a plane which passes through the radiation source or generally defines the positions of the irradiation sources will be located at an angle with respect to a bottom wall or support surface against which the hand is to be placed. The radiation sources, at, on or just beneath the inclined plane, generally describe the intersection line of a conical or pyramidal surface with the inclined plane.

In accordance with a feature of the invention, the radiation source is approximately horseshoe-shaped and so positioned that its central region, spaced from the base or bottom wall of the housing and support wall for the hand, irradiates the fingers from above; by depressing the end portions of the irradiation source, the nails of the thumb, however, are irradiated from the side.

Consequently, the position of a single such bent lamp roughly follows the position of the fingers. The end portions of the radiation source then suitably can irradiate the nail of the thumb of either the left hand or of the right hand, when placed on the bottom or support wall of the housing.

The arrangement has the advantage that radiation can be specifically directed to cure plastic material applied to the nails. The shape of the irradiation source can be so arranged that it forms the intersecting line of a body of rotation with respect to an intersecting plane, which, depending on the angle of inclination, can be circular, parabolic or elliptic. Parabolic or elliptic shapes of the radiation source are preferred. If the radiation source is formed by short straight lamps, the short straight lamps should be so arranged that they are either tangent to or form chords of sections of such a parabolic, elliptic or circular line, with an opening left for introduction of the hand into the apparatus, and where no radiation is emitted or desired.

In accordance with a preferred feature of the invention, the arcuate or polygonal path should cover at least 180°, preferably, however, extending between 200° and 240°. An angular range of from 200° to 270° provides for positions of the ends of the radiation sources so that they are sufficiently inwardly bent to be directed at essentially right angles to the nails of the thumbs. In accordance with a preferred feature of the invention, the end portions of the radiation sources are essentially straight, that is, not bowed or bent.

The arcuate form can be approximated by providing a plurality of straight radiation sources, for example by three or four straight linear radiation lamps, one, each, forming an end portion of the generally horseshoe-shaped radiation source and the third extending transversely to the longitudinal axis of the housing, and symmetrical with respect thereto. In such an arrangement, the index finger, and the second and fourth fingers are clearly associated with the central straight radiation source; the fifth or little finger likewise is associated with a central radiation source, the lateral radiation sources then being positioned to irradiate respective ones of the thumbs of the right and left hand. Better matching of the curved portion to the hand can be obtained by dividing the central radiation source into two individual lamps which can be located starting from a center portion of the housing and extending towards either side. If the lamps used are straight UV radiation tubes, an obtuse angle of at least 90°, and preferably between about 140° to 150° between two such lamps is suitable.

In accordance with a preferred feature of the invention, the radiation source is a curved, essentially horseshoe-shaped structure of elliptic form in which the larger axis of the ellipse extends at right angle to the longitudinal axis of the housing.

Reflectors surrounding the radiation sources at least in the region of the longitudinal axis of the housing reduce stray radiation and loss of radiation. At least one of the reflectors can be subdivided into a plurality of reflector units or elements which reflect radiation specifically towards the respective fingers of the hands. The reflectors may be adjustable and the reflector units can be so arranged that the reflected radiation is directed towards the fingers of the user or, respectively, the base plate of the housing in different directions.

Drawings, illustrating embodiments of the invention.

DETAILED DESCRIPTION

Figure 1:
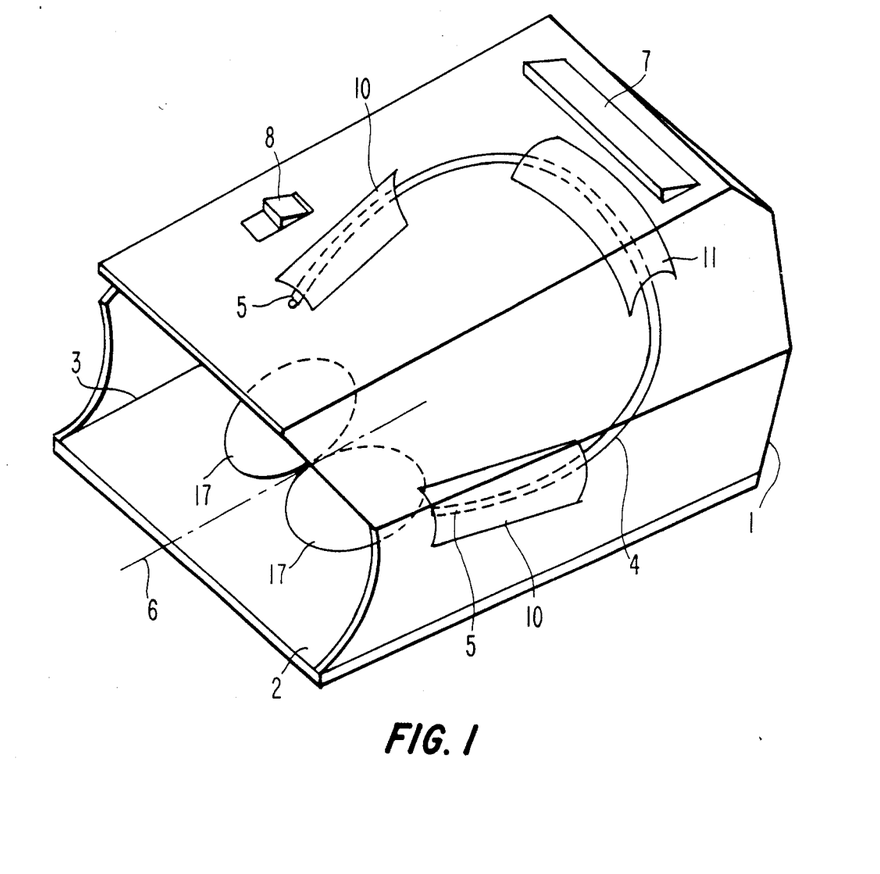
FIG. 1 is a perspective view of the radiation apparatus in accordance with the present invention, partly in phantom representation, to make interior elements visible.

A housing 1, see FIG. 1, has a bottom wall 2, which also forms a hand support plate. The housing 1 is formed with an inlet opening 3 to permit a hand to be slipped thereinto. The bottom wall 2 can support either the right hand or the left hand. A UV radiation source 4 in form of a U-bent low-pressure discharge lamp is located within the housing. The axis of lamp 4 forms a portion of a curve which is the outer contour of the intersection between a plane and the surface of a body of rotation. .Preferably radiation source 4, will be circular, parabolic or elliptic. The ends 5 of the radiation source, and positioned beneath reflectors 10, are inclined in the direction of the longitudinal axis 6, shown schematically in chain-dotted representation in FIG. 1. Thus, the ends 5 are inwardly directed towards the longitudinal axis 6 of the housing. The opening between the end portions 5 of the radiation tube is directed towards the opening 3 of the housing. The central region of the irradiation tube 4 is spaced from the bottom wall 2 by a spacing distance which is larger than the spacing distance of the ends 5. Consequently, the right region, with respect to FIG. 1, of the housing may be higher than the left portion thereof adjacent the inlet opening 3. Such a geometry of the housing 1 has the advantage that the user, whose hand is introduced into the housing for radiation of the nails, does not see the irradiation tube 4 and, hence, is not subjected to UV radiation. The upper side of the housing 1 is formed with a ventilation slit 7 in order to prevent excessive heating of the rear portion thereof. An ON/OFF switch 8 is located on the upper side of the housing; the switch 8 may include a timer.

Figure 2:
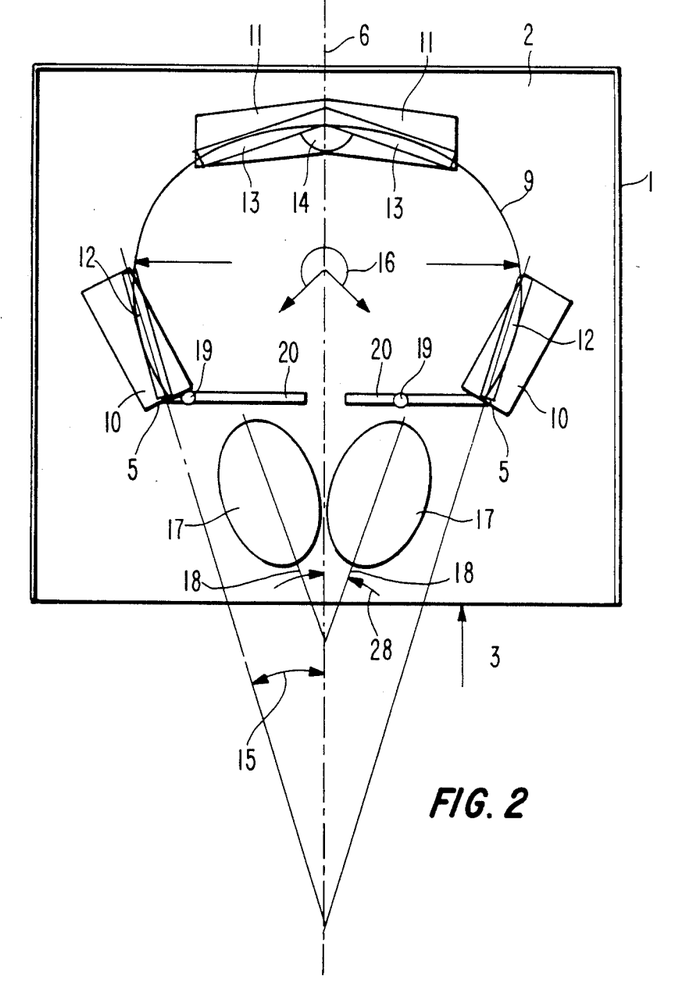
FIG. 2 is a top view of the apparatus with the top cover plate removed.
Figure 3:
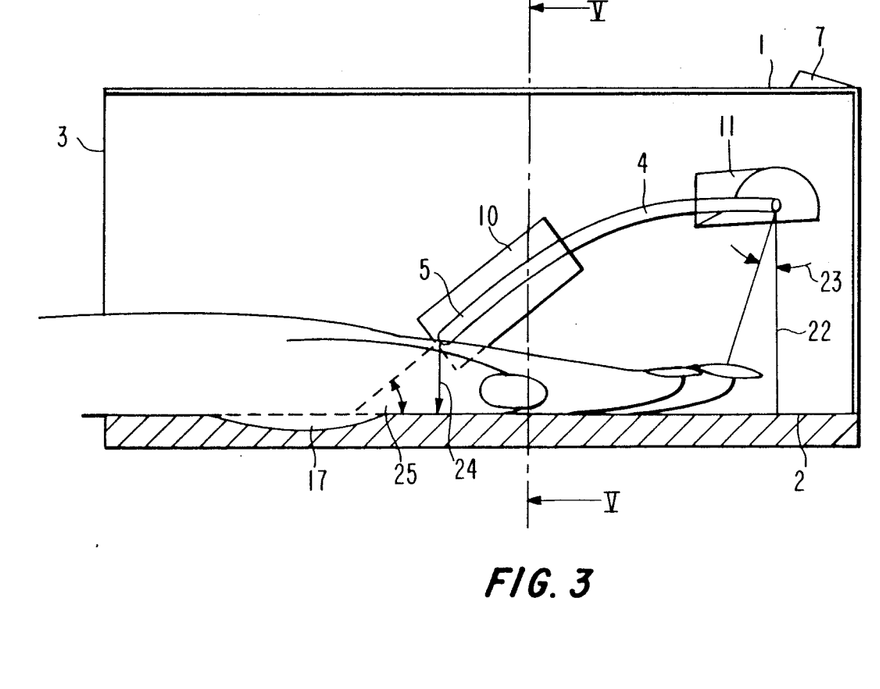
FIG. 3 is view along a longitudinal axis of the apparatus and, schematically, showing the fingers of a hand, with nails thereon, in position for radiation.
Figure 4:
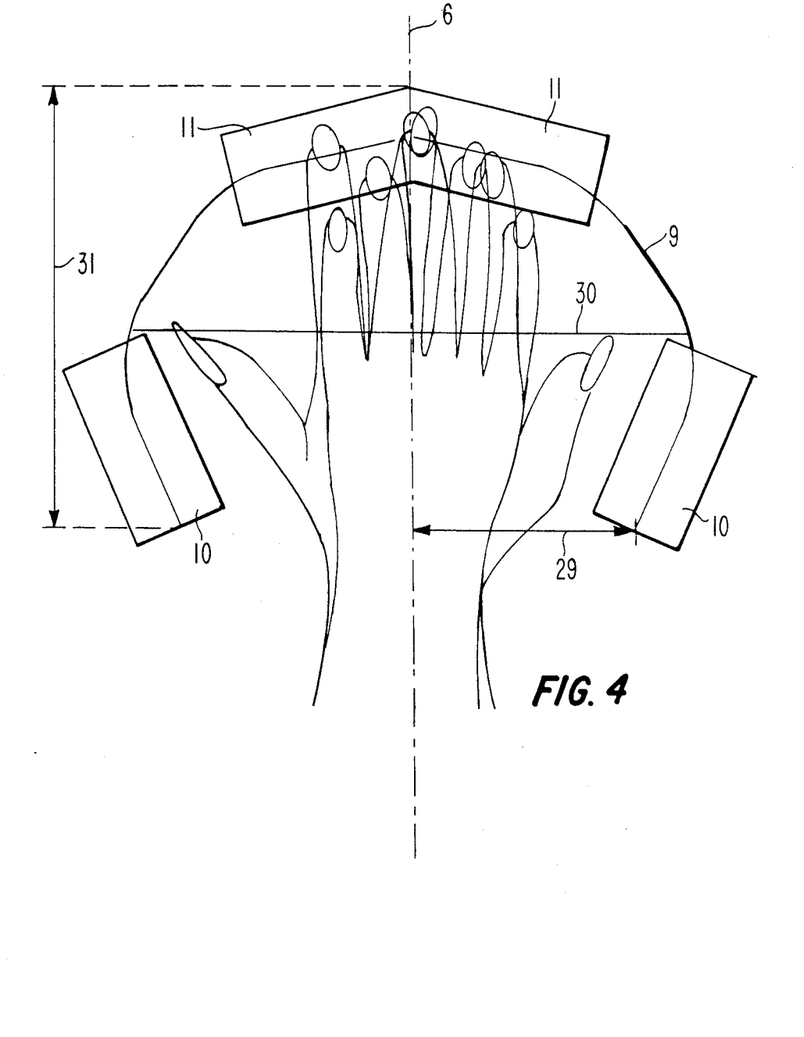
FIG. 4 is a schematic view of a lamp arrangement using straight lamps, for radiation of both right and left hand, in which the hands are superimposed.

The geometry of the radiation tube 4 is best seen by reference to FIGS. 2, 3 and 4. The axis of the lamp 4 is schematically shown in FIGS. 2 and 4 by the full line 9. Reflectors 10 and 11 are associated with portions of the source 4. Reflectors 11 are located in the central part of the source 4, extending above the index finger, the middle, ring and small finger of a hand. Reflectors 10 are located in the end region of the radiation tube 4 and are placed to direct radiation to the thumbs of, respectively, the right and left hand. The region of the tube 4 along which the reflectors 10 and 11 are located are important for targeted direction of UV rays on the nails to be cured.

The irradiation source 4 may be a single continuous bent tube, as shown in FIG. 1; the radiation source may, however, also be constructed in form of short straight tube elements which are so placed that, at the end portions of the continuous line 9, a single tube, each, is located and one or two straight tubes are located in the central region of the line 9. The straight tubes at the end regions are shown in FIG. 2 at 12 and the central tube elements beneath the reflectors 11 at 13. The respective tube elements 13 are placed with respect to each other to include an obtuse angle 14 between each other which may, for example, be in the order of about 150°. The individual tubes 12 in the region of the end portions of the overall theoretical curve positioning line 9 of the radiation source are positioned at an angle 15 with respect to the longitudinal axis 6 of the apparatus of between about 15° to 25°. The specific orientation of the individual tubes 12, 13 then will provide an irradiation zone which is essentially arcuate and corresponds, for purposes of irradiation of the fingernails, roughly to that of a continuous tube 4. The main direction of irradiation from the individual tubes 12 will extend approximately vertically on the plane of the nails of the right as well as of the left thumb which, when the hand of the user is positioned on the bottom plate, will be outwardly directed. The index finger, middle finger and fourth finger of the right and left hand require an essentially V-shaped radiation field which is well approximated by the two individual tubes 13, located as described.

The overall angle of coverage of the radiation source 4, if a single tube, or the coverage of the radiation sources 12 and 13, is shown schematically at 16, and covers approximately 270°.

The left hand as well as the right hand may be positioned beneath the radiation sources. FIG. 4 illustrates placement of either hand in the apparatus, in which the center line of a continuous radiation source 9, and corresponding to a radiation zone, as well as reflectors 10 and 11 are shown. Preferably, the bottom wall 2 provides positioning or locating depressions 17 (see FIGS. 2 and 3), which are essentially bowl-shaped, and located at lateral sides of the longitudinal axis 6, in the region of the inlet opening 3. The depressions 17 have generally oval or elliptic outer contour, with their major axes 18 including an angle 28 with the longitudinal axis 6 of the housing 1 of about 20°. The depressions 17 are provided to receive the balls of the hands and are located essentially in prolongation of, respectively, the left and right thumb.

The depressions 17 thus ensure that either hand will be properly irradiated and the position of either hand with respect to the radiation lamps for uniform reception of radiation is ensured. Other positioning arrangements may be used, for example pins 19, which are located vertically with respect to the bottom of support plate 2. As best seen in FIG. 2, the locating pins 19 can be positioned in slits 20 and slidably movable at a right angle with respect to the longitudinal axis 6 of the housing. The pins can be shifted from a left position to a right position. In the left position, the left pin 19 is located outside of the positioning field of the hand; the right pin 19 can be shifted away from or towards the longitudinal axis 6 of the housing. The region of the hand between thumb and index finger is then placed around the pin 19, so that the left hand is limited in positioning in the housing by the pin 19 at the left side and between thumb and index finger at the right side thereof. Both pins 19 can be coupled to a common spindle for example (not shown) so that, upon shifting one of the pins 19, the other pin likewise will be shifted, when change-over from one hand to the other is desired. Pins 19 in slits 20, or similar pin-and-guide slit arrangements provide for additional location of the hands of the user besides the depression 17, although they may be used independently and in lieu of such depressions 17.

The spacing of the radiation source in the respective central region and the end regions 5 is best seen in FIG. 3. In the central region, and where the radiation source intersects the central line of symmetry 6, and where the radiation source is above the index finger, middle and ring finger, as well as the small finger, the spacing of the radiation source from the nails, with respect to a vertical line, perpendicular to the bottom plate 2, will be by an angle 23 of about 15°. This provides for essentially right-angle radiation of the nails which, when the hand is relaxed, are slightly tilted forwardly. The height of the central line 9 of the radiation source over the base plate 2 is about 7 cm. The ends of the radiation source 9 have a spacing distance 24 from the base plate 2 of about 3 cm. A theoretical plane extending through at least the end portion 5 of the radiation source, or on which the radiation source could be positioned, includes an angle 25 with respect to the base plate in the order of about 45°. As best seen in FIG. 3, the radiation source 4 is essentially parallel to the base plate or wall 2 at the central region, and then extends in a bend towards the end portions 5, which are essentially straight. The end portion 5, which has the reflector 10 associated therewith, is approximately linear and, consequently, can be replaced by a short radiation tube element 12 (FIG. 2). These end portions are used to irradiate the nails of the thumb.

Figure 5:
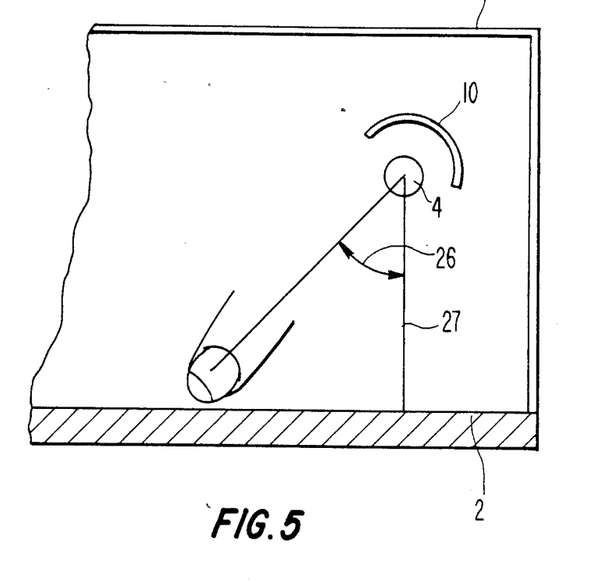
FIG. 5 is a sectional line along line V—V of FIG. 3.

The direction of irradiation is best seen in the cross-sectional view of FIG. 5, which is a section along line V—V of FIG. 3. The ends of the radiation source 4, either a complete lamp or a lamp element 12, are laterally offset with respect to the thumb of a hand on the bottom wall 2, and shown schematically in FIG. 5. The radiation is directed by the reflectors 10 under an angle of about 45° with respect to a line 27 perpendicular to the base plate 2. This provides for essentially right-angle impingement of radiation on the nail of the thumb.

The curved portion of the radiation source, either a single tube 4 or the approximately curved arrangement by individual tubes 13, the overall outline of which is shown by line 9 (FIG. 4), is so dimensioned that, as seen in FIG. 4, the ends 5 of a single tube, or of the individual tube elements 12, terminate at a spacing of about 11 cm from the central axis 6 of the housing, as shown by dimension line 29 in FIG. 4. The general contour of the portion of the radiation source which has to irradiate the fingernails is, essentially, an ellipse, which has a major axis 30 extending at right angle to the longitudinal axis 6 of the housing, and of a dimension of about 25 cm. The maximum spacing 31 (FIG. 4) between the ends of the radiation source and the intersection of the effective radiation emission, for example due to the reflectors 11, with the central axis 6 as shown by the dimension line 3 is about 17 cm.

Figure 6:
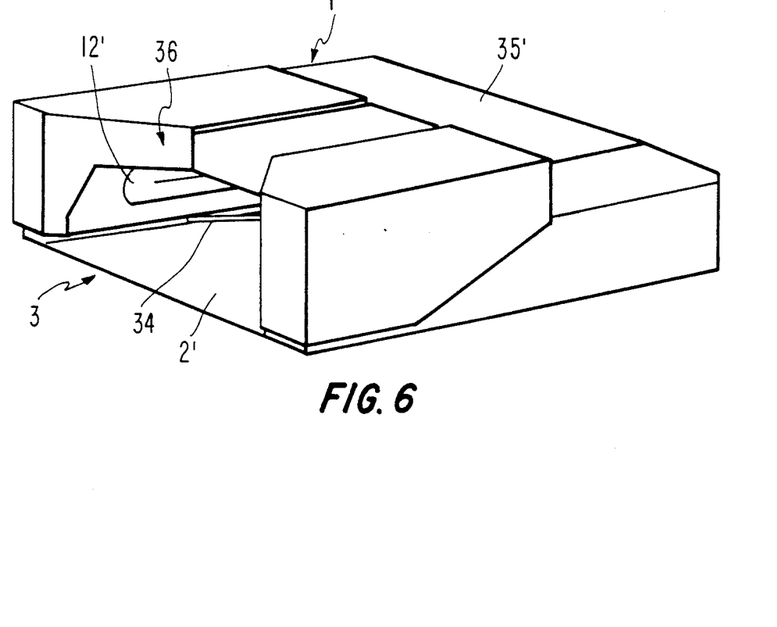
FIG. 6 is a perspective view of an embodiment which differs from that shown in FIG. 1.

The respective radiation sources, either a single tube 4 or the tube sections 12, 13, provide for excellent approximation of the overall radiation axis shown, schematically, by line 9 in FIGS. 2 and 4. The radiation zones can also be approximated by different arrangements, as seen for example in the structure of FIGS. 6 to 8.

Housing 1' is formed with a cut-out 36 at the upper side thereof adjacent the inlet opening 3, so that the back of the hand is free when the hand is located on the bottom plate 2' of the housing 1'. The housing is extended forwardly to cover lateral radiation lamps 4', 4" (FIGS. 7, 8) located on either side of the hand. The arrangement has the advantage that the back of the hand is visible to permit an assistant, such as a manicurist, to check the positioning of the hand on the bottom plate 2'. Four radiation tubes are used, all having the same length, namely lateral tubes 4', 4" and top tubes 4a, 4b. The arrangement and the placement of the tubes are clearly seen in FIGS. 7 and 8. The top tubes 4a, 4b form upper radiation elements 13a, 13b which are so positioned that their axes form an angle 14 of about 90° with respect to each other. The two radiation sources 12', 12" which can be formed by tubes 4', 4" extend parallel to the outer wall of the housing 1'. They are located beneath or below the central radiation sources 13a and 13b or, respectively, beneath the bases 33', 33" supporting the respective tubes 4a, 4b. The center lines of the tubes 4a, 4b, and between which the angle 14 is formed, are shown in chain-dotted lines 9', 9". The center lines 9', 9" of the radiation sources, as far as the nails of a hand inserted into the opening are concerned, approximate the curved portion of the radiation source 4 (FIG. 1). Only the end portions of the radiation sources 12', 12" are utilized to irradiate the nails of the thumb of the right or left hand, respectively.

The spacing 22 (FIG. 8) of the axes 9', 9" of the tubes 4a, 4b from the bottom plate or bottom wall 2 is about 6 cm. The axes of the lateral lamps 4', 4" are spaced by a distance 27 of about 2 cm above the plane defined by the bottom wall 2. A bulge or raise 34 is formed on the bottom wall to form a positioning ridge for the hand of a user. The ridge 34 is approximately collinear with projected axes 9', 9" of the radiation tubes 4a, 4b, and hence not visible in FIG. 7. An additional positioning stop 35 for the ends of the fingers introduced into the housing 1' is formed at the end thereof.

All control parts and accessories for the apparatus, such as the transformer, ballast, ventilator, fan, and other accessory apparatus for the radiation tubes, not further shown and standard components of radiation apparatus, can be located in the space 35' behind the stop 35. The ridge 34 may be so positioned and shaped that it also forms a stop for the tips of the fingers which do not reach the stop line 35.

Figure 7:
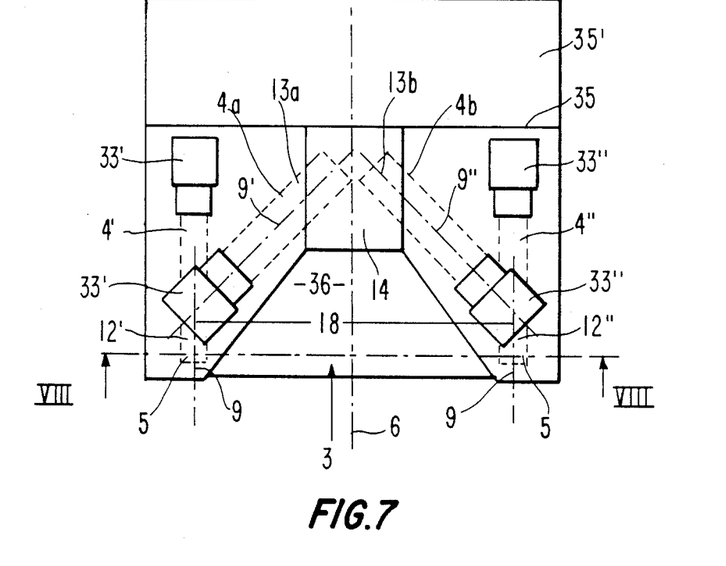
FIG. 7 is a top view of the apparatus of FIG. 6 illustrating another embodiment.
Figure 8:
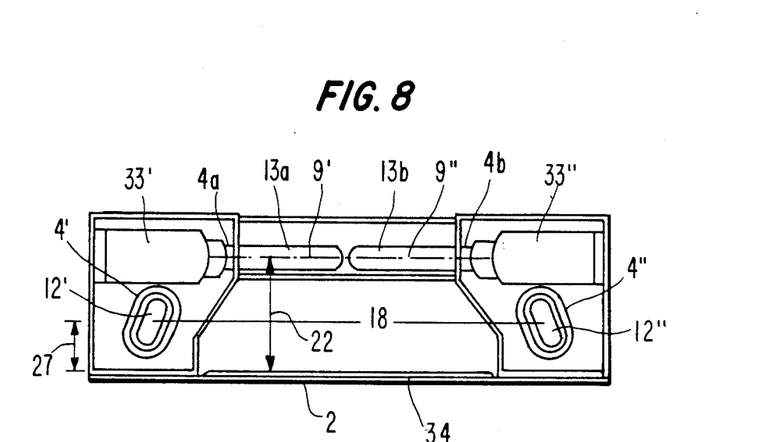
FIG. 8 is a sectional view along line VIII—VIII of FIG. 7, in which section hatching of the housing has been omitted for clarity.

The reflector or reflectors 11, in the central region of the radiation source, which can also be placed for example over the lamps shown in FIGS. 7 and 8, are so located with respect to the longitudinal axis 6 of the housing that the main radiation direction extends between about 5° and 20° with respect to a line perpendicular to the bottom plane of the plate 2, preferably under an angle of about 10°. This then will result in effective right-angle impingement of radiation on the nails of the fingers, except the thumb, which in a natural relaxed position is slightly forwardly bent and inclined downwardly, so that the nails will be at right angles to the impinging radiation. The nails of the thumb, which generally extend at an inclination with respect to the side, are likewise irradiated with essentially perpendicularly impinging radiation by so locating the reflectors 10, positioned in the region of the end portion of the radiation source or sources, that the principal radiation direction has an angle of between 30° and 60° with respect to a line perpendicular to the base plate, preferably about 45°.

The ends of the radiation sources adjacent the inlet opening 3 to the housing 1 or 1', respectively, from the longitudinal axis, is about 10 to 20 cm, preferably about 15 cm. Using a spacing of 15 cm results in a clearance space between the ends of the radiation sources adjacent the inlet opening 3 of about 30 cm, which will result in a spacing of the axis of the radiation source to the respective nail of the thumb of between 15 to 50 mm.

The spacing perpendicular above the bottom plate 2 of the ends 5 of the radiation source should be between about 5 to 8 cm. The size of the portion covering the index finger, middle finger, fourth and fifth finger are so selected that the maximum distance in the region of the longitudinal axis, and extending transversely thereto, and for example forming essentially a chord across the hands, extends between about 20 to 30 cm, or even slightly thereover, preferably about 30 cm.

The spacing of the radiation sources from the base plate 2 in the region of the fingers, except for the thumb, should be between about 5 to 20 cm, preferably about 5 to 6 cm, which will result in a spacing of the axis of the radiation source from the upper side of the fingernails, and specifically with respect to the fingernail of the middle finger, of about 3 cm, when using standard miniature UV irradiation tubes.

The dimensions above given are not critical, but provide a very suitable and preferred spacing of the radiation sources from each other, with respect to each other, and with respect to the base or support plate 2 of the housing, to permit irradiation of the nails, to provide appropriately directed radiation, and also radiation to nails of hands of varying sizes; it must be considered that the hands, as well as the length of the fingers vary with individuals and may cover a certain range of dimensions which, all, receive the appropriate radiation, when using the above-indicated preferred dimensions.

It is important to properly locate the hands on the base plate 2 so that the nails will be exposed to the radiation from the radiation sources. Suitable positioning elements for the hands are, therefore, used. In a simple and very effective positioning arrangement, bowl-like depressions 17 can be formed in the base plate in the region of the inlet opening 3, at both sides of the longitudinal axis of the housing, and symmetrically thereto, one depression for each one of the hands. Preferably, the depressions are bowl-shaped and matched to the shape of the ball of a human hand, that is, they have generally oval or elliptic outline at the intersection with the base plate. The major axes of the ellipses formed by such depressions are inclined with respect to the longitudinal axis of the housing such that the angle between the major axis and the longitudinal axis 6 of the housing is between about 30° to 40°, preferably about 30°. The depressions are preferably so positioned that, in the direction to the inlet opening 3, they are offset to be located in advance of the termination of the radiation source, that is, between the terminal ends of the end portions 5 of the radiation source and the beginning of the inlet opening of the housing, as seen in FIG. 2.

Positioning of the hand can be additionally improved by using stops in the form of the pins 19, slidable in slots or slits 20 of the housing. Preferably, two pins 19 are provided which are located on either side of the longitudinal axis of the housing by a distance of between 4 to 6 cm. These pins can then be placed between the thumb and index finger of, respectively, the right or left hand. The pins can readily be matched to the hands of the user by sliding them in the slots or slits 20, which act as guideways, in order to permit changing the spacing of the pins from the longitudinal axis 6 of the housing. A groove formed in the bottom plate to permit sliding of the pins is suitable, the pins extending into the groove or the groove can continue to form a slit within which the pins are slidable. The pins can be suitably positioned by holding nuts, stops, or the like. External positioning of the pins can be provided for by carrying the pins on a threaded spindle, coupled thereto by a spindle nut, so that upon rotation of the spindle, both pins 19 are shifted simultaneously. The spindle nuts can be axially elongated to provide positioning holes for individual adjustment of the pins. The pins 19 can be used also without the positioning depressions 17.

The length of the radiation sources 12, 13 (FIGS. 2, 3) or 4', 4'', 4a, 4b (FIGS. 7 and 8) may be between about 8 to 10 cm. Preferably, all radiation sources are of the same length although the lamps which are located in the region of the end portions 5 of the radiation source, for example the lamps 4', 4'' (FIGS. 7, 8) are not utilized over their entire length. Suitable shielding can be provided to prevent UV radiation of the skin of the user where it is not desired.

Various changes and modifications may be made, and any features described herein may be used with any of the others, within the scope of the inventive concept.

I claim:

1. Fingernail irradiation apparatus for curing photocurable plastic artificial fingernail substance, having
    a housing (1) having a bottom wall (2), said housing being formed with an opening (3) for introduction of a hand of the user into the housing, said housing defining a longitudinal axis (6) intersecting said opening (3);
    elongated radiation source means, having a central region and a pair of end portions (5) positioned adjacent said opening (3), and emitting, at least in part, ultraviolet (UV) radiation, located within the housing, spaced from the bottom wall; and
    radiation reflector means (10; 11), optically associated with said radiation source means, for directing radiation toward the fingernails on the fingers of the hand of a user, when said fingers are inserted into the opening (3) and placed against the bottom wall (2);
    wherein, in accordance with the invention,
    the radiation source means (4; 12, 13; 4', 4'', 4a, 4b) is located symmetrically with respect to said longitudinal axis (6) and extending at least in part in essentially horseshoe-shaped, arcuate or polygonal form above the bottom wall (2), leaving a free space adjacent said opening (3),
    said radiation source means being spaced, in a region intersecting said longitudinal axis (6), from the bottom wall by a spacing distance (22) which is greater than a spacing distance (24) of the end portions (5) of the elongated radiation source means positioned adjacent said opening (3) of said housing (2),
    said radiation source means defining a theoretical plane on, or in, which the radiation source means is located, said plane being inclined at an angle of inclination (25) with respect to the bottom wall (2), said radiation source means, in said plane, defining a contour line (9) which is formed by the intersection of said inclined plane with a conical or pyramidal surface.

2. The apparatus of claim 1, wherein said elongated radiation source means (4; 12, 13) extends in essentially part-arcuate configuration and said contour line is formed by the intersection of said inclined plane with, essentially, a body of rotation.

3. The apparatus of claim 1, wherein (FIGS. 6–8) said elongated radiation source means comprises a plurality of straight-line sections which are positioned, in top view, in polygonal configuration, and said contour line is formed by the intersection of said theoretical inclined plane with the outer surfaces of a pyramid.

4. The apparatus of claim 1, wherein said radiation source means in essentially part-horseshoe form extends over at least about 180°.

5. The apparatus of claim 1, wherein the end portions (5) of the essentially horseshoe-shaped radiation source means (4) comprise essentially straight portions.

6. The apparatus of claim 5, wherein the straight end portions of the radiation source means (4, 12) form an angle (15) with the longitudinal axis (6) of the housing of between about 20° to 40°.

7. The apparatus of claim 1, wherein said essentially horseshoe-shaped radiation source means comprises at least three radiation sources (12, 13), two of said radiation sources comprising straight radiation lamps (12) located at the end portions (5) of said radiation source means and the third radiation source (13) being positioned at the apex region of the essentially horseshoe-shaped radiation source means and extending essentially transversely to the longitudinal axis (6) of the housing, and symmetrically with respect thereto, and essentially parallel to the bottom wall of the housing.

8. The apparatus of claim 7, wherein the third radiation source (13) comprises two radiation lamps (13), one each being located on either side of the longitudinal axis (6).

9. The apparatus of claim 8, wherein said radiation lamps (13) are straight lamps which, between themselves, define an obtuse angle (14).

10. The apparatus of claim 7, wherein the radiation source means comprises elongated radiation tubes of from about 8 to 10 cm in length.

11. The apparatus of claim 1, wherein the radiation reflector means comprises at least one reflector (11) located in the region of the longitudinal axis (6) of the housing (1) and positioned for directing radiation on the nails of the fingers of a user when introduced into the opening (3) into the housing.

12. The apparatus of claim 11, wherein the at least one reflector (11) directs radiation towards the bottom wall (2) of the housing at an angle of between about 5° and 20° with respect to a line perpendicular to the bottom wall (2) of the housing, and inclined towards said opening (3) in the housing.

13. The apparatus of claim 1, wherein the radiation reflector means comprises end reflectors (10), optically associated with end portions (5) of the radiation source means, and directing radiation from the radiation source means principally in a direction which is inclined with respect to the longitudinal axis (6) of the housing.

14. The apparatus of claim 13, wherein a principal direction of radiation reflected by the end reflectors forms an angle (26) of between about 30° to 60° with respect to a line perpendicular to the bottom wall (2).

15. The apparatus of claim 1, wherein the end portions (5) of the radiation source means have a spacing (29) from the longitudinal axis (6) of the housing of about 15 cm, ±5 cm.

16. The apparatus of claim 1, wherein a maximum spacing (31) of the radiation source means from the apex of the essentially horseshoe, arcuate or polygonal form to the end portions thereof is about 15 cm, ± about 5 cm.

17. The apparatus of claim 1, further including positioning means located on the bottom wall (2) for positioning either the right or left hand of a user in the housing (1) with the nails on the fingers exposed to said radiation source means.

18. The apparatus of claim 17, wherein the positioning means comprises bowl-shaped depressions (17) located adjacent said opening (3) into the housing at both sides of the longitudinal axis (6).

19. The apparatus of claim 17, wherein the positioning means comprises positioning pins (19) extending essentially vertically from the bottom wall (2) to form stop elements for placement between fingers of the hand of the user.

20. The apparatus of claim 17, wherein the positioning means comprises a ridge or bead (34) formed on the bottom wall and forming a stop for the tips of the fingers, when the fingers of the hand of a user are inserted into the opening (3) and the hand is placed against the bottom wall.

21. The apparatus of claim 1, wherein the housing (1') is formed with an opening region on an upper side thereof to expose the back of the hand of a user, inserted in position to expose the nails on the fingers to said radiation source means.

22. The apparatus of claim 1, wherein (FIGS. 6-8) said radiation source means comprises
two elongated radiation-emitting tubes (4', 4'') located symmetrically with respect to said longitudinal axis (6) of the housing and adjacent sides thereof;
and at least one further radiation-emitting tube (4a, 4b) positioned above said elongated radiation-emitting tubes (4', 4'') and extending across said axis of the housing symmetrically with respect thereto.

23. The apparatus of claim 22, wherein said at least one further radiation-emitting tube comprises
two radiation-emitting tubes (4a, 4b), each located at an angle with respect to said axis (6) and, between themselves, defining an obtuse angle, thereby forming a part of said essentially horseshoe-shaped radiation source means.

* * * * *